US 008553041B1

(12) United States Patent
Danskin

(10) Patent No.: US 8,553,041 B1
(45) Date of Patent: Oct. 8, 2013

(54) SYSTEM AND METHOD FOR STRUCTURING AN A-BUFFER TO SUPPORT MULTI-SAMPLE ANTI-ALIASING

(75) Inventor: John M. Danskin, Providence, RI (US)

(73) Assignee: NVIDIA Corporation, Santa Clara, CA (US)

( * ) Notice: Subject to any disclaimer, the term of this patent is extended or adjusted under 35 U.S.C. 154(b) by 888 days.

(21) Appl. No.: 12/208,211

(22) Filed: Sep. 10, 2008

(51) Int. Cl.
  *G06T 1/60* (2006.01)
(52) U.S. Cl.
  USPC .......................................................... 345/530
(58) Field of Classification Search
  USPC ................. 345/506, 555, 556, 418, 530, 544, 345/613
  See application file for complete search history.

(56) References Cited

U.S. PATENT DOCUMENTS

| | | | |
|---|---|---|---|
| 6,697,063 | B1 | 2/2004 | Zhu |
| 7,102,646 | B1 | 9/2006 | Rubinstein et al. |
| 7,167,181 | B2 | 1/2007 | Duluk et al. |
| 7,170,515 | B1 | 1/2007 | Zhu |
| 7,184,040 | B1 | 2/2007 | Tzvetkov |
| 7,218,317 | B2 * | 5/2007 | Liao et al. ................. 345/418 |
| 7,286,134 | B1 * | 10/2007 | Van Dyke et al. .......... 345/544 |
| 2003/0095127 | A1 * | 5/2003 | Blais ........................... 345/555 |
| 2006/0170703 | A1 * | 8/2006 | Liao ............................ 345/613 |
| 2006/0209078 | A1 | 9/2006 | Anderson et al. |
| 2009/0091577 | A1 * | 4/2009 | Brothers ..................... 345/506 |

OTHER PUBLICATIONS

Office Action in U.S. Appl. No. 11/950,352, mailed Feb. 15, 2011.
Office Action in U.S. Appl. No. 11/950,355, mailed Feb. 15, 2011.
Office Action, U.S. Appl. No. 12/208,204 dated Jun. 8, 2011.
Greens, "Hierarchical Rendering of Complex Environments", A dissertation submitted in partial satisfaction of the requirements for the degree of Doctor of Philosophy in Computer and Information Sciences, University of California, Santa Cruz, Jun. 1995.

* cited by examiner

Primary Examiner — Ke Xiao
Assistant Examiner — Kyle Zhai
(74) Attorney, Agent, or Firm — Patterson & Sheridan, LLP

(57) ABSTRACT

One embodiment of the present invention sets forth a technique for efficiently creating and accessing an A-Buffer that supports multi-sample compression techniques. The A-Buffer is organized in stacks of uniformly-sized tiles, wherein the tile size is selected to facilitate compression techniques. Each stack represents the samples included in a group of pixels. Each tile within a stack represents the set of sample data at a specific per-sample rendering order index that are associated with the group of pixels represented by the stack. Advantageously, each tile includes tile compression bits that enable the tile to maintain data using existing compression formats. As the A-Buffer is created, a corresponding stack compression buffer is also created. For each stack, the stack compression buffer includes a bit that indicates whether all of the tiles in the stack are similarly compressed and, consequently, whether the GPU may operate on the stack at an efficient per pixel granularity.

23 Claims, 11 Drawing Sheets

SYSTEM AND METHOD FOR STRUCTURING AN A-BUFFER TO SUPPORT MULTI-SAMPLE ANTI-ALIASING

BACKGROUND OF THE INVENTION

1. Field of the Invention

The present invention relates generally to the field of graphics processing and more specifically to a system and method for structuring an A-Buffer to support multi-sample anti-aliasing.

2. Description of the Related Art

One task that a graphics processing unit (GPU) may perform when transforming 3-D images into 2-D images is to determine the visible color of each pixel in the image. Each pixel may include multiple samples, wherein each sample corresponds to a different location within the image covered by the pixel. To determine the color at each pixel, each sample intersected by an object may be evaluated to create a portion of the overall color of the pixel that includes a variety of effects, such as transparency and depth of field. For example, suppose each pixel includes four samples, and two objects abut in a particular pixel. One of the samples may reflect the color of the first object, and three of the samples may reflect the color of the second object. The contributions from all four samples may be evaluated when determining the visible color for the pixel using well-known techniques, such as multi-sample anti-aliasing, that improve image quality by, among other things, reducing edge artifacts in images.

Some GPUs increase the efficiency of multi-sample anti-aliasing by using a variety of compression techniques to reduce memory bandwidth and computational work. For example, if all of the samples included in a particular pixel are the same color, then the GPU may determine that the pixel is compressible and may represent all four samples (i.e., the pixel) using the information needed to represent only a single color. Similarly, if all of the pixels included in an image tile of proximally located pixels are compressible, then the GPU may determine that the image tile is compressible and may represent the image tile using a reduced amount of color information. Reducing the data used to represent the pixels and image tiles reduces the memory bandwidth used when accessing the pixels and tiles in memory. Further, the GPU may save computational work by performing blending operations and the like using the compressed pixel representations instead of the sample representations.

In some approaches to determining the visible color of each pixel, the objects in an image may need to be rendered in a specific order to ensure that the visible color of each pixel in the generated image is realistic. However, in other approaches, the sample data representing the intersections of samples by the various objects may be collected, sorted, and reduced to an image that accurately displays advanced effects irrespective of the order in which the objects are rendered. One structure that computing systems may implement in these various approaches is an A-Buffer—a memory structure that maintains sample data associated with each polygon that intersects the pixels of an image frame being rendered.

In one approach to organizing an A-Buffer, the A-Buffer stores a linked list of the sample data. One drawback to this approach is that the A-Buffer structure is not conducive to some of the most frequently used sample data access patterns. For example, when a polygon is rendered, much of the corresponding sample data is located in adjacent pixels at the same per-sample rendering order index (PSROI). As is well known, memory accesses are usually most efficient if they can be grouped such that successive accesses target data that is closely located within the memory—known as memory locality. Thus, an efficient memory structure would enable sample data of this nature, located at the same index, to be simultaneously accessed. However, since each sample in the A-Buffer has a separate linked list, sample data corresponding to adjacent samples at the same PSROI may be far apart in memory, leading to poor memory locality. Consequently, accesses to the A-Buffer may be inefficient. Another drawback is that the sample data corresponding to each sample is stored discretely and, therefore, such an approach does not support the compression techniques that GPUs oftentimes use to reduce memory bandwidth and increase efficiency.

As the foregoing illustrates, what is needed in the art is a more effective technique for creating and accessing an A-Buffer that supports multi-sample anti-aliasing.

SUMMARY OF THE INVENTION

One embodiment of the present invention sets forth a method for generating an A-Buffer for storing sample information. The method includes the steps of receiving an image frame comprised of a plurality of pixels, where each pixel is comprised of a plurality of samples, dividing the image frame into one or more pixel groups, where a number of pixels in each of the one or more pixel groups is based on a tile size and a number of samples in each pixel, and generating a sample depth complexity image based on the image frame, where each entry in the sample depth complexity image reflects a maximum per-sample rendering order index, or number of potentially visible surfaces, associated with a different one of the samples in the image frame. The method also includes the steps of determining a stack height for each pixel group, based on the sample depth complexity image, where the stack height reflects a maximum maximum per-sample rendering order index (PSROI) associated with the samples in the pixel group, determining a number of tiles associated with the A-Buffer based on the stack heights determined for the one or more pixel groups, and allocating memory space for the A-Buffer based on the number of tiles associated with the A-Buffer.

One advantage of the disclosed method is that organizing the A-Buffer by both pixel proximity and PSROI improves the memory locality, thereby increasing the efficiency of memory accesses used when rendering image data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
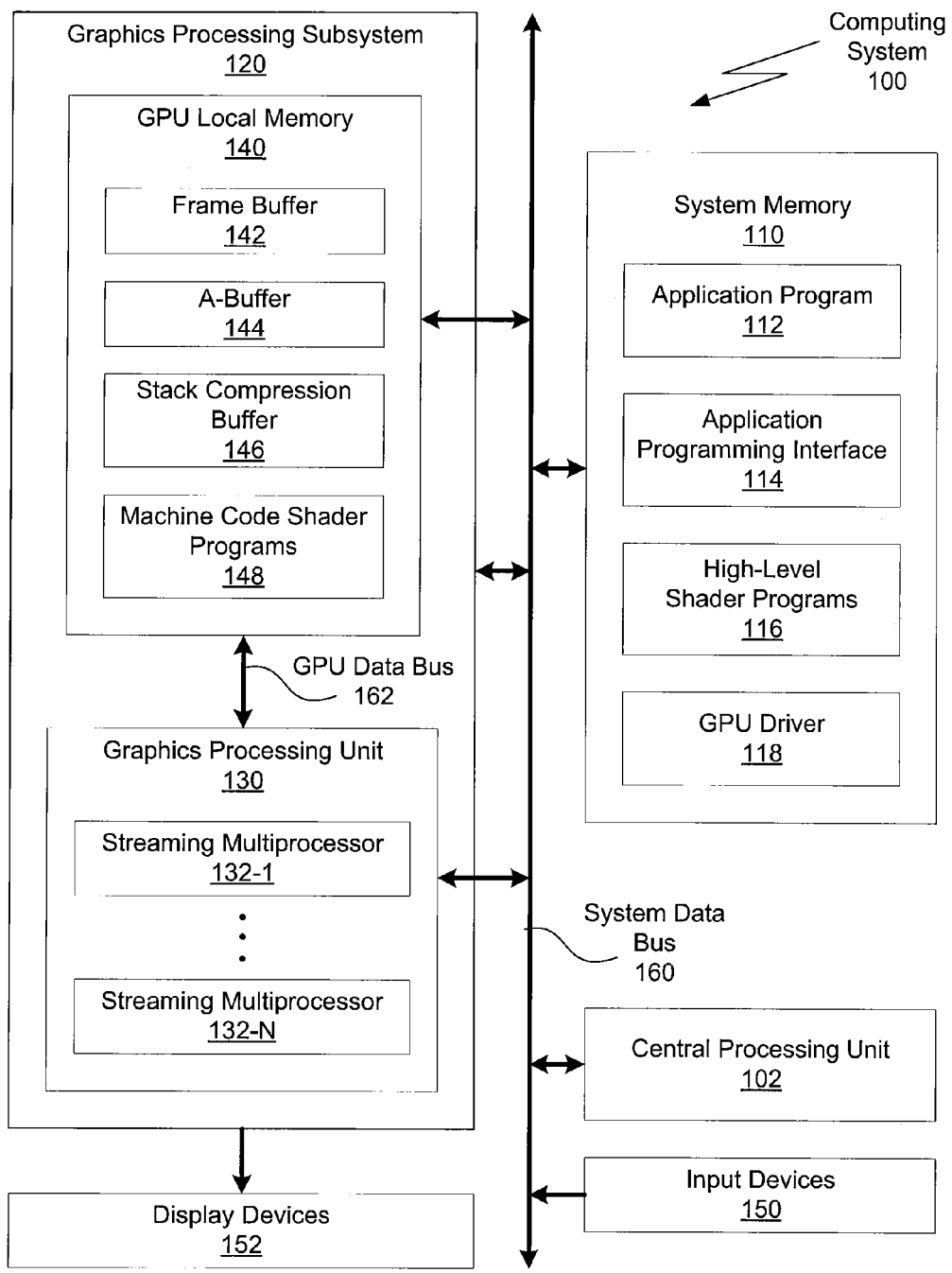
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system data bus 160, a central processing unit (CPU) 102, input devices 150, a system memory 110, a graphics processing subsystem 120, and display devices 152. In alternate embodiments, the CPU 102, portions of the graphics processing subsystem 120, the system data bus 160, or any combination thereof, may be integrated into a single processing unit. Further, the functionality of the graphics processing subsystem 120 may be included in a chipset or in some other type of special purpose processing unit or co-processor.

The system data bus 160 connects the CPU 102, the input devices 150, the system memory 110, and the graphics processing subsystem 120. In alternate embodiments, the system memory 110 may connect directly to the CPU 102. The CPU 102 receives user input from the input devices 150, executes programming instructions stored in the system memory 110, operates on data stored in the system memory 110, and configures the graphics processing subsystem 120 to perform specific tasks in the graphics pipeline. The system memory 110 typically includes dynamic random access memory (DRAM) used to store programming instructions and data for processing by the CPU 102 and the graphics processing subsystem 120. The graphics processing subsystem 120 receives instructions transmitted by the CPU 102 and processes the instructions in order to render and display graphics images on the display devices 152.

The system memory 110 includes an application program 112, an application programming interface (API) 114, high-level shader programs 116, and a graphics processing unit (GPU) driver 118. The application program 112 generates calls to the API 114 in order to produce a desired set of results, typically in the form of a sequence of graphics images. The application program 112 also transmits one or more high-level shading programs 116 to the API 114 for processing within the GPU driver 118. The high-level shading programs 116 are typically source code text of high-level programming instructions that are designed to operate on one or more shaders within the graphics processing subsystem 120. The API 114 functionality is typically implemented within the GPU driver 118. The GPU driver 118 is configured to translate the high-level shading programs 116 into machine code shading programs that are typically optimized for a specific type of shader (e.g., vertex, geometry, or fragment).

The graphics processing subsystem 120 includes a graphics processing unit (GPU) 130, a GPU local memory 140, and a GPU data bus 162. The GPU 130 is configured to communicate with the GPU local memory 140 via the GPU data bus 162. The GPU 130 may receive instructions transmitted by the CPU 102, process the instructions in order to render graphics data and images, and store these images in the GPU local memory 140. Subsequently, the GPU 130 may display certain graphics images stored in the GPU local memory 140 on the display devices 152.

The GPU 130 includes one or more streaming multiprocessors 132. Each of the streaming multiprocessors 132 is capable of executing a relatively large number of threads concurrently. Advantageously, each of the streaming multiprocessors 132 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 132 may be configured as one or more programmable shaders (e.g., vertex, geometry, or fragment) each executing a machine code shading program (i.e., a thread) to perform image rendering operations. The GPU 130 may be provided with any amount GPU local memory 140, including none, and may use GPU local memory 140 and system memory 110 in any combination for memory operations.

The GPU local memory 140 is configured to include machine code shader programs 148, an A-Buffer 144, a stack compression buffer 146, and a frame buffer 142. The machine code shader programs 148 may be transmitted from the GPU driver 118 to the GPU local memory 140 via the system data bus 160. The machine code shader programs 148 may include a machine code vertex shading program, a machine code geometry shading program, a machine code fragment shading program, or any number of variations of each. The A-Buffer 144 may be used to store a collection of sample data associated with each polygon that intersects the pixels in an image frame that is being rendered for display. The stack compression buffer 146 may be used to store information related to the A-Buffer for purposes of compression. The frame buffer 142 stores data for at least one two-dimensional surface that may be used to drive the display devices 152. Furthermore, the frame buffer 142 may include more than one two-dimensional surface so that the GPU 130 can render to one two-dimensional surface while a second two-dimensional surface is used to drive the display devices 152.

The display devices 152 are one or more output devices capable of emitting a visual image corresponding to an input data signal. For example, a display device may be built using a cathode ray tube (CRT) monitor, a liquid crystal display, or any other suitable display system. The input data signals to the display devices 152 are typically generated by scanning out the contents of one or more frames of image data that is stored in the frame buffer 142.

Figure 2:
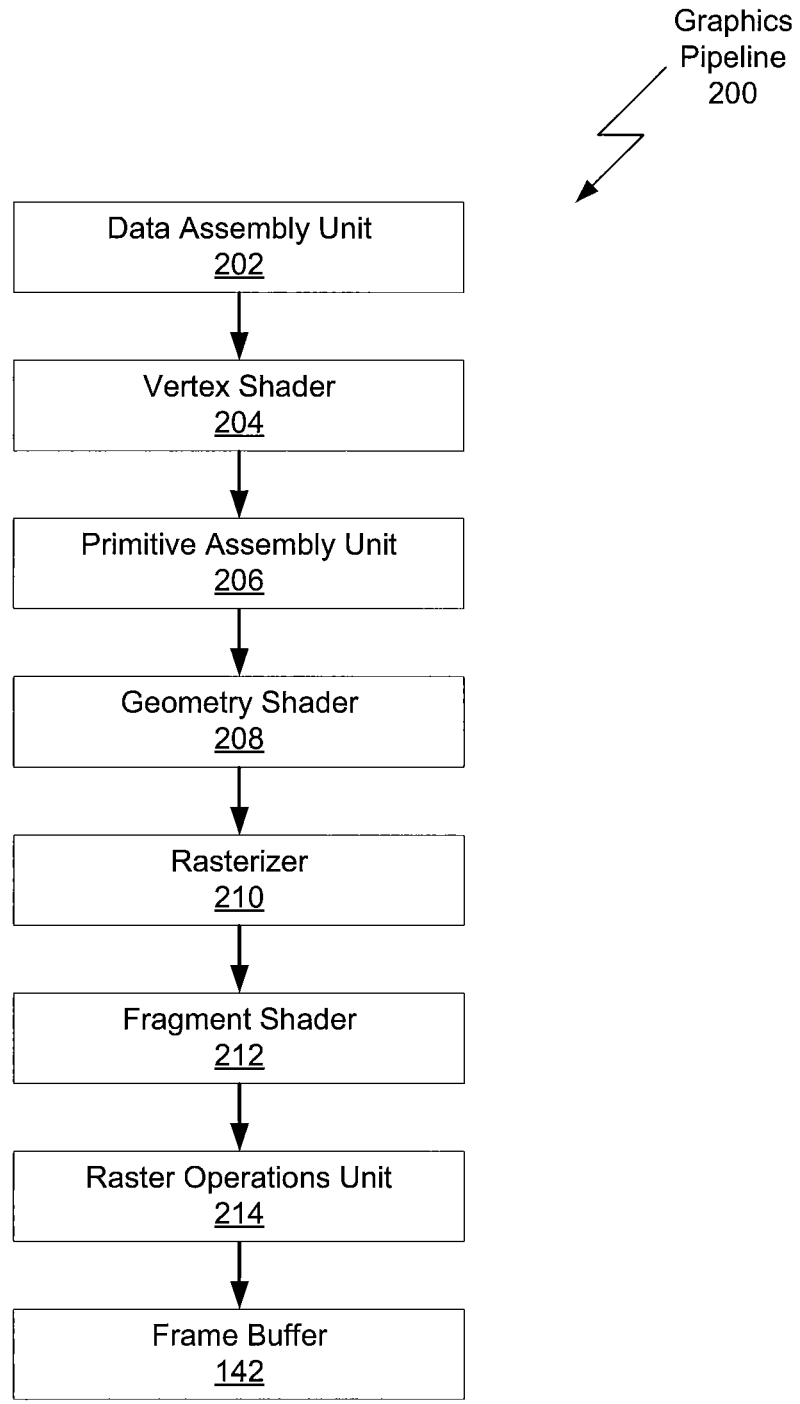
FIG. 2 is a conceptual diagram of a programmable graphics pipeline residing within the GPU of FIG. 1, according to one embodiment of the invention.

FIG. 2 is a conceptual diagram of a programmable graphics pipeline 200 residing within the GPU 130 of FIG. 1, according to one embodiment of the invention. The graphics pipeline 200 is configured to transform 3-D images into 2-D images. As shown, the graphics pipeline 200 includes a data assembly unit 202, a vertex shader 204, a primitive assembly unit 206, a geometry shader 208, a rasterizer 210, a fragment shader 212, a raster operations unit 214, and the frame buffer 142 of FIG. 1.

The data assembly unit 202 is a fixed-function unit that collects vertex data from the application program 112 for high-order surfaces, primitives, and the like, and passes the vertex data to the vertex shader 204. The data assembly unit 202 may gather data from buffers stored within system memory 110 and the GPU local memory 140 as well as from API calls from the application program 112 used to specify vertex attributes. The vertex shader 204 is a programmable execution unit that is configured to execute a machine code vertex shading program, processing vertex data as specified by the vertex shading program. For example, the vertex shader 204 may be programmed to transform the vertex data from an object-based coordinate representation (object space) to an alternatively based coordinate system such as world space or normalized device coordinates (NDC) space. The vertex processing unit 204 may access data that is stored in GPU local memory 140.

The primitive assembly unit 206 is a fixed-function unit that receives processed vertex data from vertex shader 204 and constructs graphics primitives, e.g., points, lines, triangles, or the like, for processing by the geometry shader 208. In alternative embodiments, a second primitive assembler (not shown) may be included subsequent to the geometry shader 208 in the data flow through the GPU 130. The geometry shader 208 is a programmable execution unit that is configured to execute a machine code geometry shading program, processing graphics primitives received from the primitive assembly unit 206 as specified by the geometry shading program. For example, in addition to well-known per-primitive operations such as clipping, the geometry shader 208 may be programmed to subdivide the graphics primitives into one or more new graphics primitives and calculate parameters, such as plane equation coefficients, that are used when the new graphics primitives are rasterized. The geometry shader 208 may access data that is stored in the GPU local memory 140. The geometry shader 208 outputs the parameters and new graphics primitives to the rasterizer 210.

The rasterizer 210 is a fixed-function unit that scans the new graphics primitives and outputs fragments, each containing fragment data, which may include raster position or interpolated vertex attributes, such as texture coordinates and opacity, to the fragment shader 212.

The fragment shader 212 is a programmable execution unit that is configured to execute a machine code fragment shading program, processing fragments received from rasterizer 210 as specified by the machine code fragment shading program. For example, the fragment shader 212 may be programmed to perform operations such as perspective correction, shading, blending, and the like, to produce shaded fragments that are output to the raster operations unit 214. The fragment shading engine 212 may access data that is stored in buffers in the GPU local memory 140, such as the A-Buffer 144 and the stack compression buffer 146. The raster operations unit 214 optionally performs fixed-function computations such as near and far plane clipping and raster operations, such as stencil, z test, blending and the like, and outputs pixel data as processed graphics data for storage in a buffer in the GPU local memory 140, such as the A-Buffer 144 or the frame buffer 142. Together, the rasterizer 210, the fragment shader 212 and the raster operations unit 214 represent the fragment processing domain of the GPU 130, where the raster operations unit 214 may be used to operate on individual pixels or small squares of pixels, and the fragment shader 212 may be programmed to iterate across groups of pixels. Further, the fragment shader 212 and the raster operations unit 214 may be configured to treat samples as pixels.

Figure 3A:
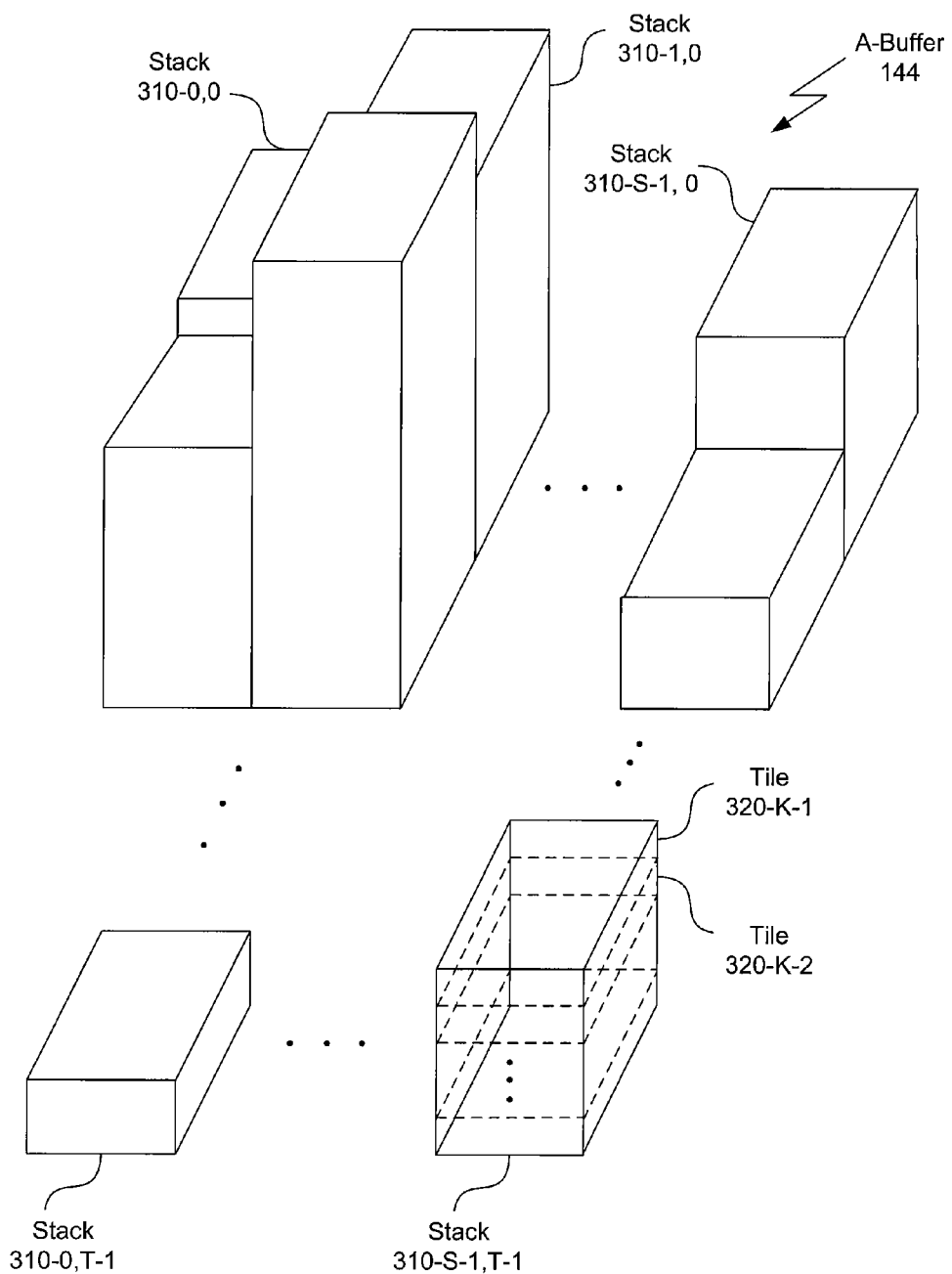
FIGS. 3A and 3B are conceptual diagrams of the A-Buffer of FIG. 1, according to one embodiment of the invention.
Figure 3B:
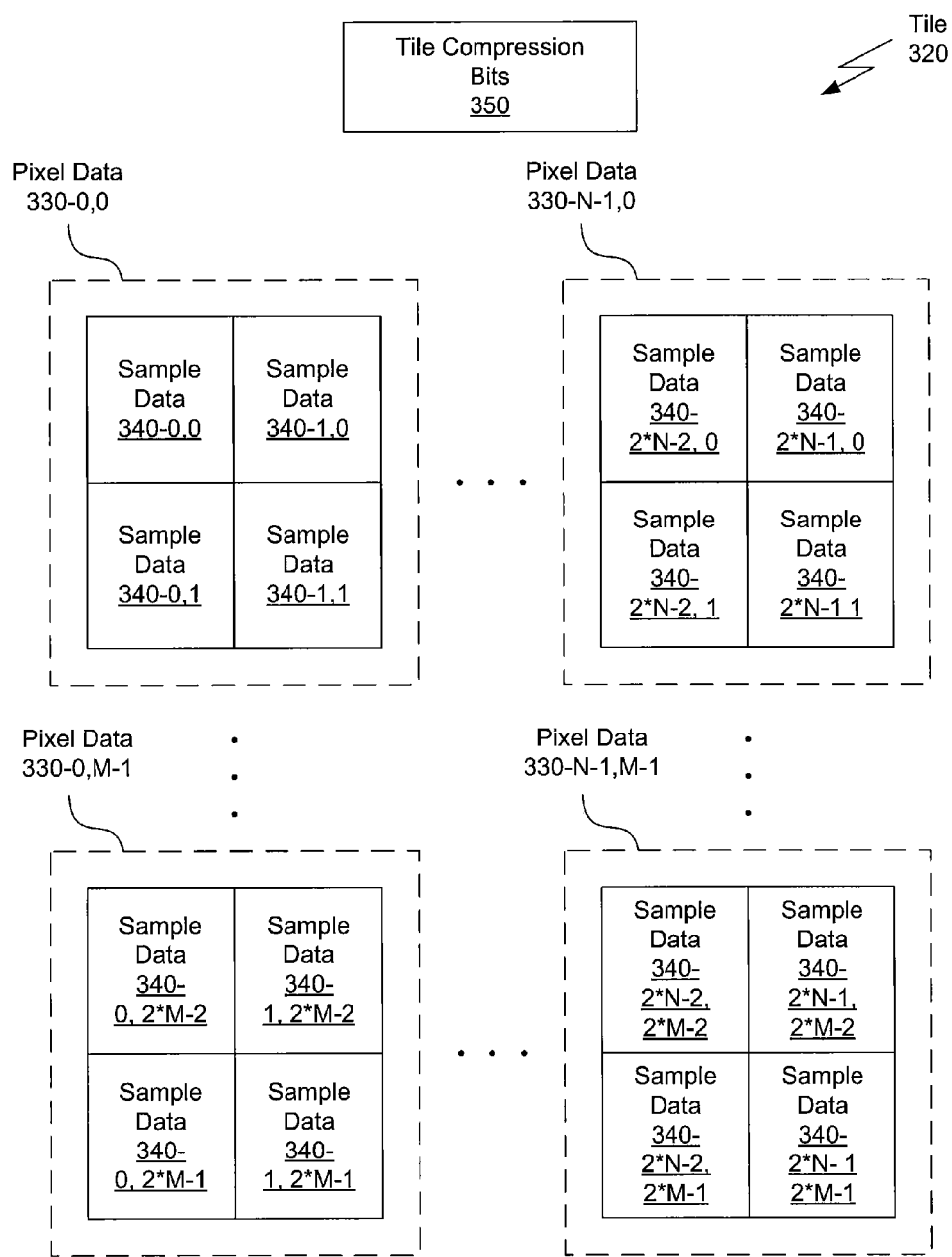

FIGS. 3A and 3B are conceptual diagrams of the A-Buffer 144 of FIG. 1, according to one embodiment of the invention. As shown in FIG. 3A, the A-Buffer 144 may include one or more stacks 310. Each of the stacks 310 may be configured to represent the sample data associated with a different group of proximally located N-by-M pixels in an image frame. Together, the stacks 310 may represent all of the sample data associated with all of the pixels in the image frame.

As shown in detail for the array 310-S-1,T-1, each of the stacks 310 may be subdivided into any number of two-dimensional tiles 320. And, as shown in detail in FIG. 3B, each tile 320 may be configured to include an N-by-M set of pixel data 330 selected and arranged to correspond to the N-by-M group of pixels represented by a specific stack 310. Similarly, each pixel may be subdivided into an F-by-G set of samples, and each pixel data 330 may be configured to include an F-by-G set of sample data 340 selected and arranged to correspond to the F-by-G samples included in the pixel represented by the pixel data 330. Consequently, the total number of sample data 340 included in each tile 320 is F*N-by-G*M. In the example of FIG. 3B, each pixel is subdivided into a two-by-two set of samples and, therefore, the total number of sample data 340 included in each tile 320 is 2*N-by-2*M.

Each tile 320 may be further configured to include only sample data 340 at a given PSROI. In such a configuration, the tiles 320 included in a given stack 310 may, together, represent all of the sample data 340 associated with the N-by-M group of pixels represented by the stack 310, where each of the tiles 320 represents the subset of the sample data 340 at a particular PSROI. As set forth in greater detail herein, organizing the sample data 340 in such a manner, by both PSROI and associated pixel proximity, optimizes the locality of memory accesses.

The size of the tiles 320, and consequently the size of the group of pixels represented by each stack 310, may be chosen by the designer and may be uniform across the A-Buffer 144. The size of the tiles 320 in conjunction with the size of the image frame may determine the number of the stacks 310 in the A-Buffer 144. Suppose, for example, that a tile size of eight-by-four samples is chosen and that each pixel includes four samples, arranged in a two-by-two configuration. And, suppose the size of a given image frame is eight-by-four pixels. The pixels in the image frame may be divided into four subsets of four-by-two pixels, and the A-Buffer 144 may be configured to include four stacks 310 of eight-by-four tiles 320, each tile 320 including eight pixels represented by thirty-two samples. In other embodiments, the tile size may be chosen to be more or less than eight-by-four, and the number of stacks 310 in the A-Buffer 144 may be more or less than four. Furthermore, the tiles may be chosen to be the units of compression and, consequently, the size of the tiles 320 may be chosen in any technically feasible fashion to facilitate various compression techniques.

Referring back now to FIG. 3A, the number of tiles 320 in each stack 310 may differ. Since each of the tiles 320 corresponds to a specific PSROI, the number of tiles 320 in a given stack 310 corresponds to the maximum depth complexity associated with any of the samples represented by the stack 310. For example, if a given stack 310 were to represent samples having two different per-sample rendering order indices, such as indices zero and one, then the stack 310 would include two tiles 320 that include one or more sample data 340 at each of these two indices. Similarly, if a given stack 310 were to include three tiles 320, then the stack 310 would include sample data 340 at three different PSROI, such as indices zero, one, and two. The GPU 130 is configured to assign tiles to each of the stacks 310, calculating the maximum depth complexity associated with the F*N-by-G*M group of samples represented by a particular stack 310 to determine the appropriate number of tiles to allocate for that stack 310.

When populating the A-Buffer 144 with sample data 340, the GPU 130 is configured to optimally pack the sample data 340 by allowing the set of sample data 340 included in each pixel data 330 to represent the intersection of one or more polygons with that particular pixel. Suppose, for example, each pixel includes four samples and four polygons intersect a particular pixel. If each polygon covers a different one of the samples included in the pixel, then the PSROI for each of the four samples would be one. And, the GPU 130 may configure a single pixel data included in a single tile included in the A-Buffer to represent the intersection of all four polygons with this particular pixel.

As shown in detail in FIG. 3B, each tile 320 also includes tile compression bits 350 reflecting any technically feasible compression format that is supported by the GPU 130. For example, the tile compression bits 350 included in a particular tile 320 may specify that the tile 320 uses a compression format that allows a two color compression scheme. In such a compression scheme, two colors may be stored for each pixel represented by the tile, and one bit may be stored for each sample included in each of these pixels, indicating which of the two colors is correct for the sample. The tile compression bits 350 associated with a particular tile 320 may indicate that the tile 320 is not compressed, in which case the sample data 340 is stored in uncompressed form, as described above.

As is well-known, accessing a compressed tile typically involves transferring less data than accessing an uncompressed tile. Consequently, the memory bandwidth used to access compressed tiles included in the A-Buffer 144 is usually less than the memory bandwidth used to access uncompressed tiles included in the A-Buffer 144. In alternate embodiments, the tiles may not include the tile compression bits, and the tile compression bits may be stored in another location that is accessible by the GPU. In other embodiments, the A-Buffer may not support compressed tiles and, consequently, the tile compression bits may not exist.

Although any number of the tiles 320 included in the A-Buffer 144 may be compressed in various embodiments, the computing system 100 is configured to ensure that the A-Buffer 144 is large enough to store all of the tiles 320 included in the A-Buffer 144 in an uncompressed fashion. Again, the computing system 100 determines the structure of the A-Buffer 144 by the size and complexity of each image frame. In one embodiment, the CPU 102 preallocates a fixed-size buffer. If the size of the A-Buffer 144 for a given image frame turns out to be larger than the size of the fixed-size buffer, then the CPU 102 subdivides the image frame into image subsets. The CPU 102 ensures that each image subset fits within the preallocated fixed-size buffer and then configures the GPU 130 to process each image subset separately. In alternative embodiments, the GPU may reallocate the A-Buffer for each image frame, allocating only enough memory to store the A-Buffer specific to the image frame.

Figure 3C:
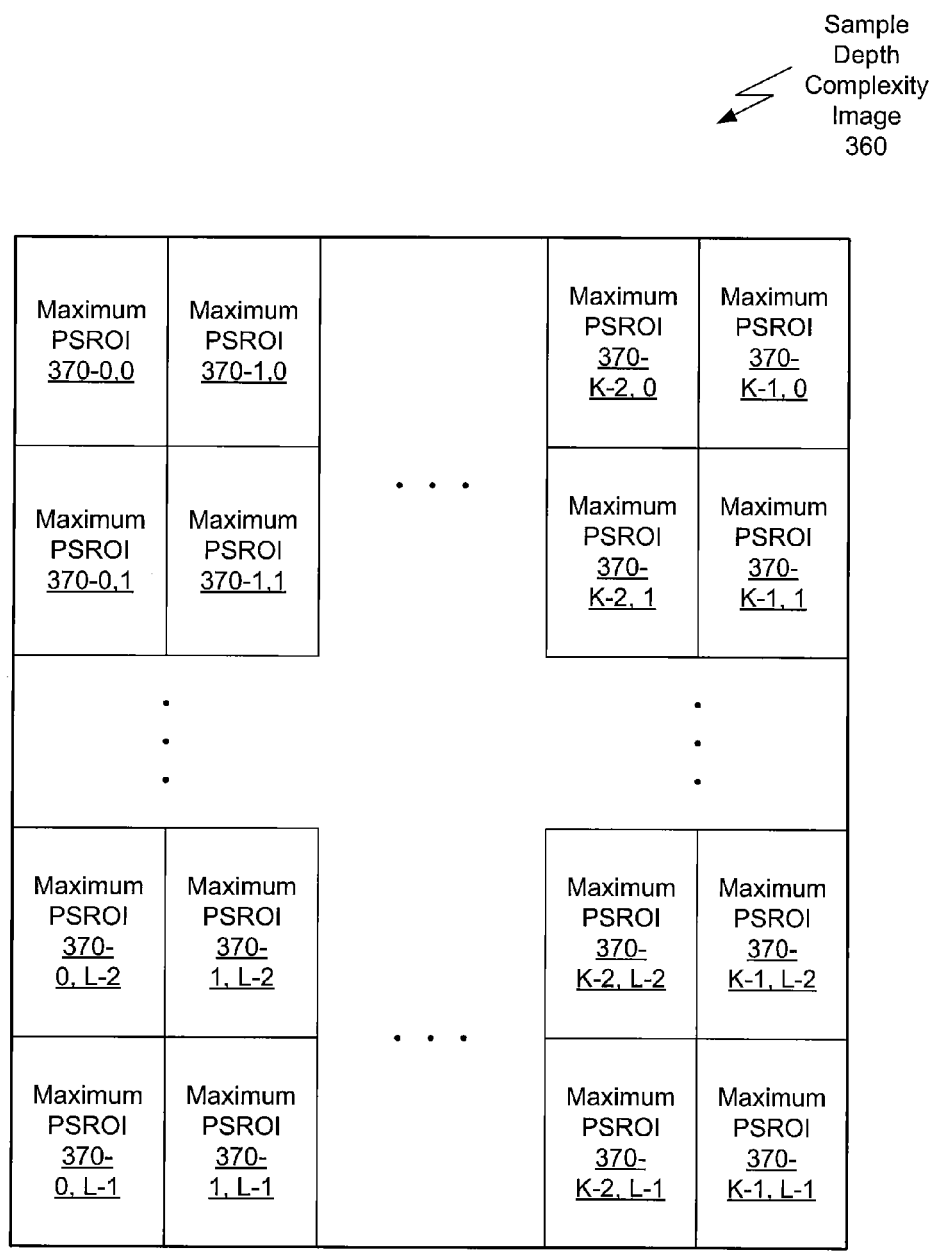
FIG. 3C is a conceptual diagram of a sample depth complexity image used to determine the structure of the A-Buffer, according to one embodiment of the invention.

FIG. 3C is a conceptual diagram of a sample depth complexity image 360 used to determine the structure of the A-Buffer 144, according to one embodiment of the invention. The sample depth complexity image 360 includes a maximum per-sample rendering order index 370 for each of the samples represented by the A-Buffer 144. As shown, the maximum PSROIs 370 are arranged in a K-by-L array, creating a total of K*L maximum PSROIs 370. In the A-Buffer 144 of FIG. 3A, there are S*T stacks of N*M pixels, and each pixel includes F*G samples. Therefore, the A-Buffer represents S*N*F*T*M*G samples, and the corresponding sample depth complexity image 360 for the A-Buffer 144 includes S*N*F*T*M*G maximum PSROIs 370.

As part of determining the structure of the A-Buffer 144, the GPU 130 receives pixel writes indicating the intersection of polygons associated with the various graphics objects in an image frame with the pixels, expands the pixel writes into sample writes, and, for each covered sample, increments the PSROI associated with the covered sample. In this fashion, the GPU 130 configures the maximum PSROIs 370 to represent the maximum rendering order index of every sample in a particular image frame. Subsequently, for each stack 310, the GPU 130 determines the maximum of the subset of maximum PSROIs 370 that correspond to the subset of samples represented by the stack 310. For each stack 310, this stack-specific maximum maximum PSROI determines the number of tiles 320 that the GPU 130 allocates for the stack 310. As will be clear to one skilled in the art, operations on the depth complexity image itself may also be compressed in accordance with existing techniques.

The GPU 130 typically, but not necessarily, uses the fragment shader 212 to create the sample depth complexity images 360 and to determine the structure of the A-Buffer 144. Subsequently, the GPU 130 may use either the raster operations unit 214 or the fragment shader 212 to populate and access the A-Buffer 144. The raster operations unit 214 may be more efficient at performing some A-Buffer 144 operations; however, since the fragment shader 212 may execute a machine code geometry shading program, the fragment shader 212 may be more flexible.

Figure 4A:
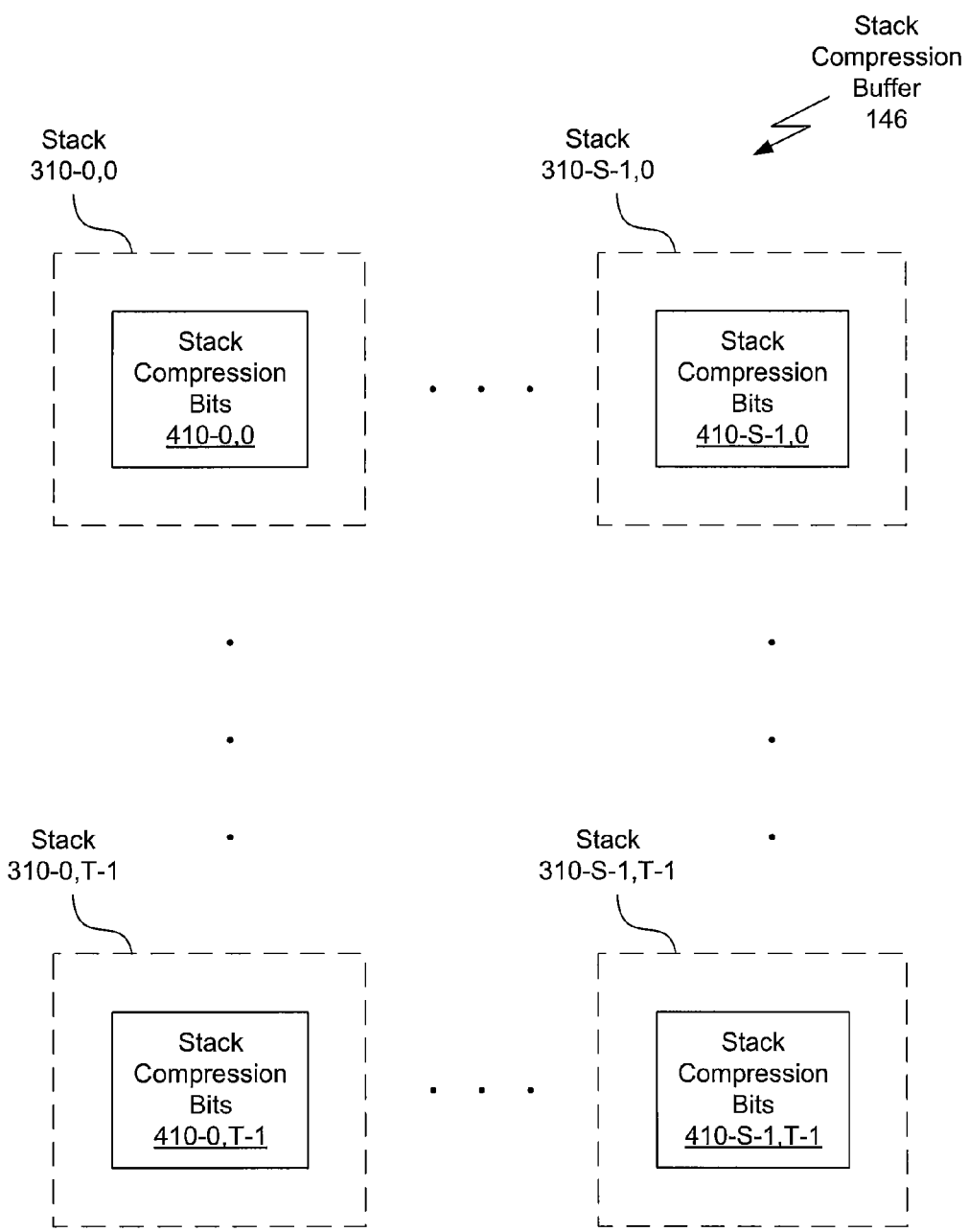
FIGS. 4A and 4B are conceptual diagrams of a stack compression buffer associated with the A-Buffer of FIG. 3A, according to one embodiment of the invention.
Figure 4B:
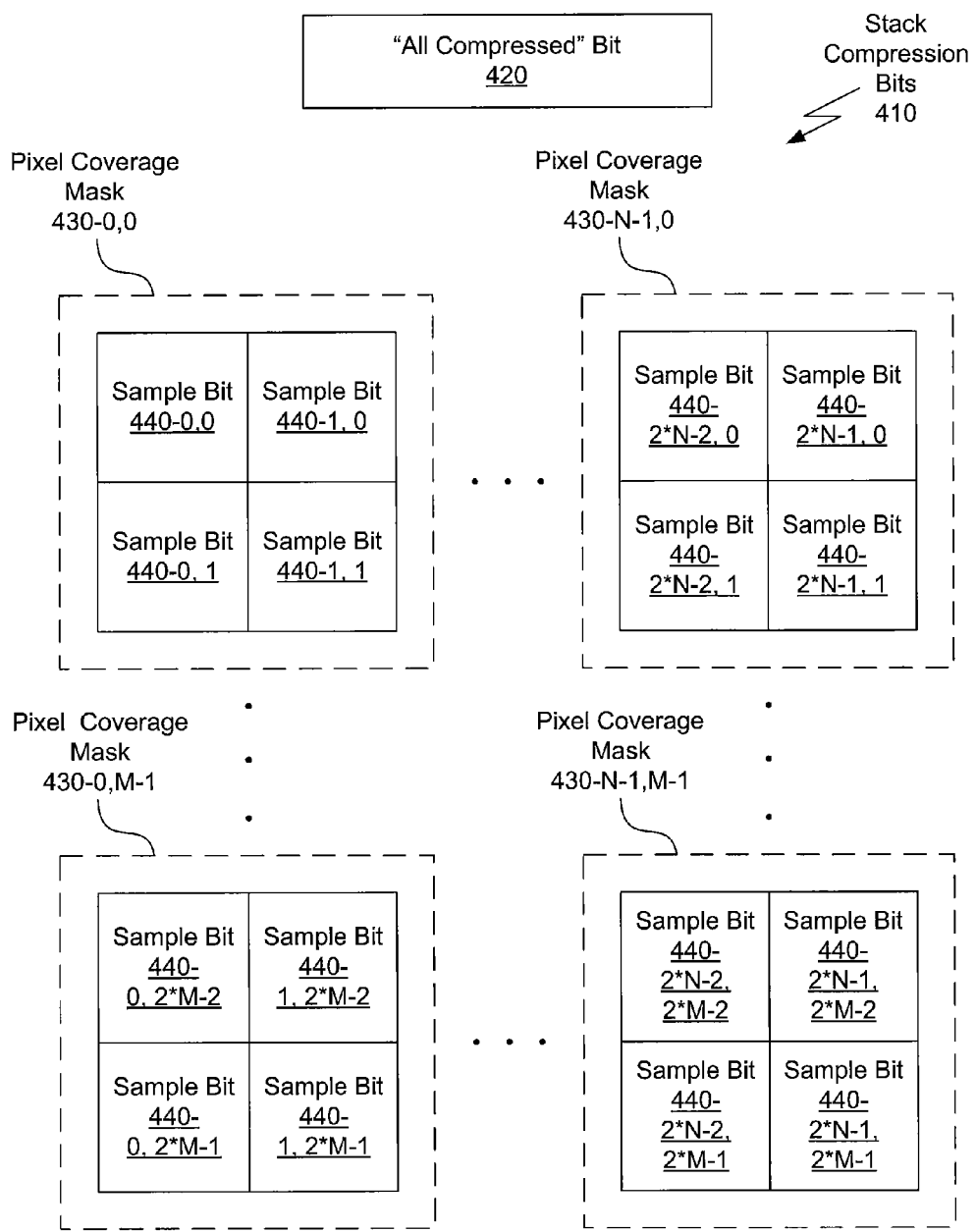

FIGS. 4A and 4B are conceptual diagrams of a stack compression buffer 146 associated with the A-Buffer 144 of FIG. 3A, according to one embodiment of the invention. As shown in FIG. 4A, the stack compression buffer 146 includes separate stack compression bits 410 for each stack 310 included in the A-Buffer 144. For each stack 310, the stack compression bits 410 enable the GPU 130 to efficiently determine whether all of the tiles 320 included in the stack 310 are similarly compressed.

As shown in detail in FIG. 4B, the stack compression bits 410 associated with a particular stack 310 include an "all compressed" bit 420 that indicates whether all of the tiles 320 included in the stack 310 are similarly compressed. If all of the tiles 320 included in the stack 310 are similarly compressed, then the GPU 130 may perform blending and other operations between tiles in the same stack using the compressed pixel representation instead of the sample representation of the pixels in the group of pixels represented by the stack 310. Thus, the "all compressed" bit 420 indicates whether the GPU 130 can operate on the stack 310 at the more efficient pixel level, as opposed to the less efficient sample level.

The stack compression bits 410 associated with a particular stack 310 also include an N-by-M set of pixel coverage masks 430, selected and arranged to correspond to the N-by-M group of pixels represented by the stack 310. Each pixel coverage mask 430 includes an F-by-G set of sample bits 440. The set of sample bits 440 includes a separate sample bit 440 for each sample included in the pixel. In the example of FIG. 4B, each pixel includes four samples arranged in a two-by-two array. Consequently, each pixel coverage mask 430 includes four sample bits 440 arranged in a two-by-two array. For each pixel coverage mask 430, the included sample bits 440 indicate a specific coverage of the corresponding pixel on a per sample basis. For example, the sample bits 440 included in a particular pixel coverage mask 430 may be set to the same value, indicating that all of the samples included in the corresponding pixel are covered by the same polygon.

The set of pixel coverage masks 430 included in the stack compression bits 410 is only meaningful when the "all compressed" bit 420 is set to true. When the "all compressed" bit 420 is set to true, the sample coverage of each of the tiles 320 included in the stack 310 corresponding to the stack compression bits 410 is the same, matching the sample bits 440 in the set of pixel coverage masks 430. While populating the A-Buffer 144, the GPU 130 also populates the stack compression buffer 146. When the GPU 130 writes the first tile 320 to a particular stack 310, the GPU 130 initializes the stack compression bits 410 corresponding to the stack 310. If the first tile 320 in a particular stack 310 is compressed, as indicated by the tile compression bits 350, then the GPU 130 sets the "all compressed bit" 420 to true. The GPU 130 also initializes the set of pixel coverage masks 430 to depict the coverage of the samples included in the first tile 320 in the stack 310. Subsequently, as the GPU 130 adds each additional tile 320 to the stack 310, if the GPU 130 determines that the additional tile 320 and the first tile in the stack 310 are not similarly compressed, then the GPU 130 sets the "all compressed bit" 420 to false.

Generally, a particular tile 320 included in a particular stack 310, and the first tile 320 included in the stack 310 are similarly compressed when two criteria are met. The first criterion is that both of the tiles 320 are compressed in the same fashion. The GPU 130 makes this determination by comparing the tile compression bits 350 included in the tiles 320. The second criterion is that the per sample coverage of the tiles 320 match. In other words, the coverage of each sample included in the particular tile 320 should match the coverage of the corresponding sample included in the first tile 320. The GPU 130 makes this second determination by comparing the sample coverage of the particular tile 320 to the set of pixel coverage masks 430 associated with the stack 310.

In alternative embodiments, the stack compression buffer may include an "all compressed" bit corresponding to each stack in the A-Buffer, but may not include pixel coverage masks. In such a embodiment, the GPU may determine that all of the tiles in a particular stack are similarly compressed when all of the tiles included in the stack are compressed in the same fashion, and the sample data included in each pixel data included in the stack has the same value. In other words, at each PSROI (represented by a tile), all of the sample data corresponding to a particular pixel has the same value. However, the pixel data may differ throughout the tile and throughout the stack.

Again, the GPU 130 may use either the raster operations unit 214 or the fragment shader 212 to populate and access the stack compression buffer 146. In alternative embodiments, the information in the stack compression buffer may be stored in any technically feasible fashion using any number and type of data structures. In other embodiments, the GPU may not maintain any stack compression information in conjunction with the A-Buffer and, consequently, the stack compression buffer may not exist.

Figure 5:
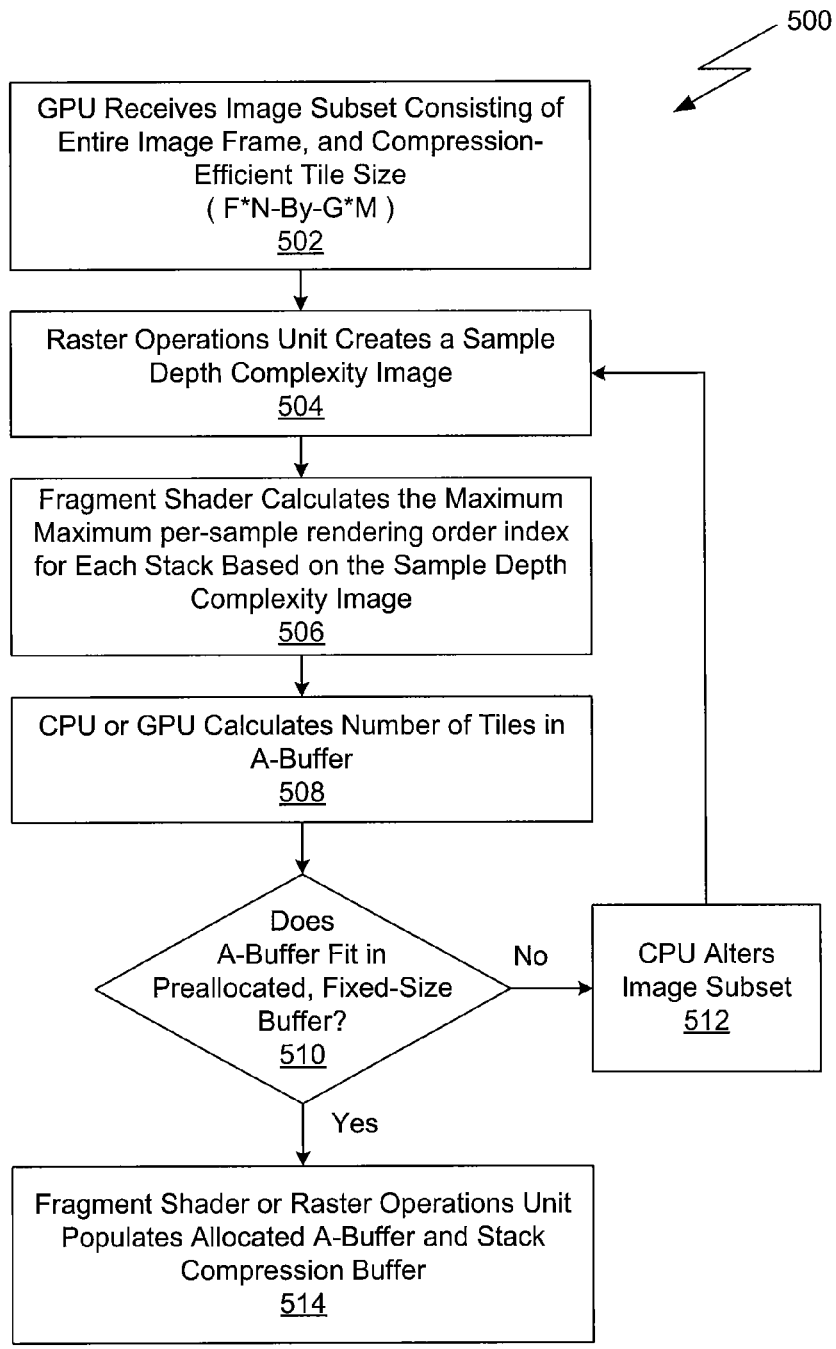
FIG. 5 is a flow diagram of method steps for allocating the A-Buffer 144 of FIG. 1 and the associated stack compression buffer 146, according to one embodiment of the invention.

FIG. 5 is a flow diagram of method steps for allocating the A-Buffer 144 of FIG. 1 and the associated stack compression buffer 146, according to one embodiment of the invention. Although the method steps are described in conjunction with the systems for FIGS. 1-4, persons skilled in the art will understand that any system that performs the method steps, in any order, is within the scope of the invention.

The method 500 begins at step 502, where the GPU 130 receives an image subset consisting of an entire image frame and a compression-efficient tile size, F*N-by-G*M. As described above in conjunction with FIG. 3, the tile size corresponds to the size of the group of samples represented by each of the stacks 310 in the A-Buffer 144. At step 504, the raster operations unit 214 creates a sample depth complexity image 360 by calculating the maximum rendering order index for each sample included in the image subset. A series of method steps for calculating a sample depth complexity image 360 is described in greater detail below in FIG. 6.

At step 506, the fragment shader 212 calculates the maximum PSROI for each stack 310 in the A-Buffer 144 based on the sample depth complexity image 360. More specifically, the fragment shader 212 divides the sample depth complexity image 360 into F*N-by-G*M groups of maximum PSROIs 370, where F*N-by-G*M is the tile size received in step 402. As part of step 506, the fragment shader 212 assigns each F*N-by-G*M group of samples to a specific stack 310 in the A-Buffer 144. Also as part of step 506, the fragment shader 212 evaluates the maximum PSROI 370 of each of the samples associated with each of the F*N-by-G*M groups of samples and determines a single maximum maximum per-sample rendering order index for each F*N-by-G*M group of samples. The single maximum maximum PSROI defines the number of tiles 320 assigned to the stack 310 in the A-Buffer 144 associated with the F*N-by-G*M group of samples.

At step 508, the CPU 102 or the GPU 130 calculates the total number of tiles 320 in the A-Buffer 144. In one embodiment, the CPU sums the total number of tiles 320 assigned to each of the stack 310 in the A-Buffer 144 to determine the total number of tiles 320 in the A-Buffer 144. At step 510, if the CPU 102 or the GPU 130 determines that the size of the A-Buffer 144 is not supported by a preallocated, fixed-sized buffer, then the method 500 proceeds to step 512. The determination of whether the size of the A-Buffer 144 is supported by the preallocated, fixed-size buffer may be made in any technically feasible fashion. For example, the total number of tiles required to represent the A-Buffer my be compared with the total number of tiles that may be represented using the preallocated, fixed-size buffer. At step 512, the CPU 102 alters the image subset (e.g., the CPU may halve the image subset), and the method 500 returns to step 504. The method 500 continues in this fashion, looping through steps 504-512, until an image subset is identified that fits in the preallocated, fixed-size buffer reserved for the A-Buffer structure.

If, at step 510, the CPU 102 or the GPU 130 determines that the size of the A-Buffer 144 is supported by the preallocated, fixed-size buffer, then the method 500 proceeds to step 514. At step 514, the fragment shader 212 or the raster operations unit 214 populates the preallocated A-Buffer 144 and the associated stack compression buffer 146 using the various sample data associated with the image subset, as described herein, and the method 500 terminates.

Figure 6:
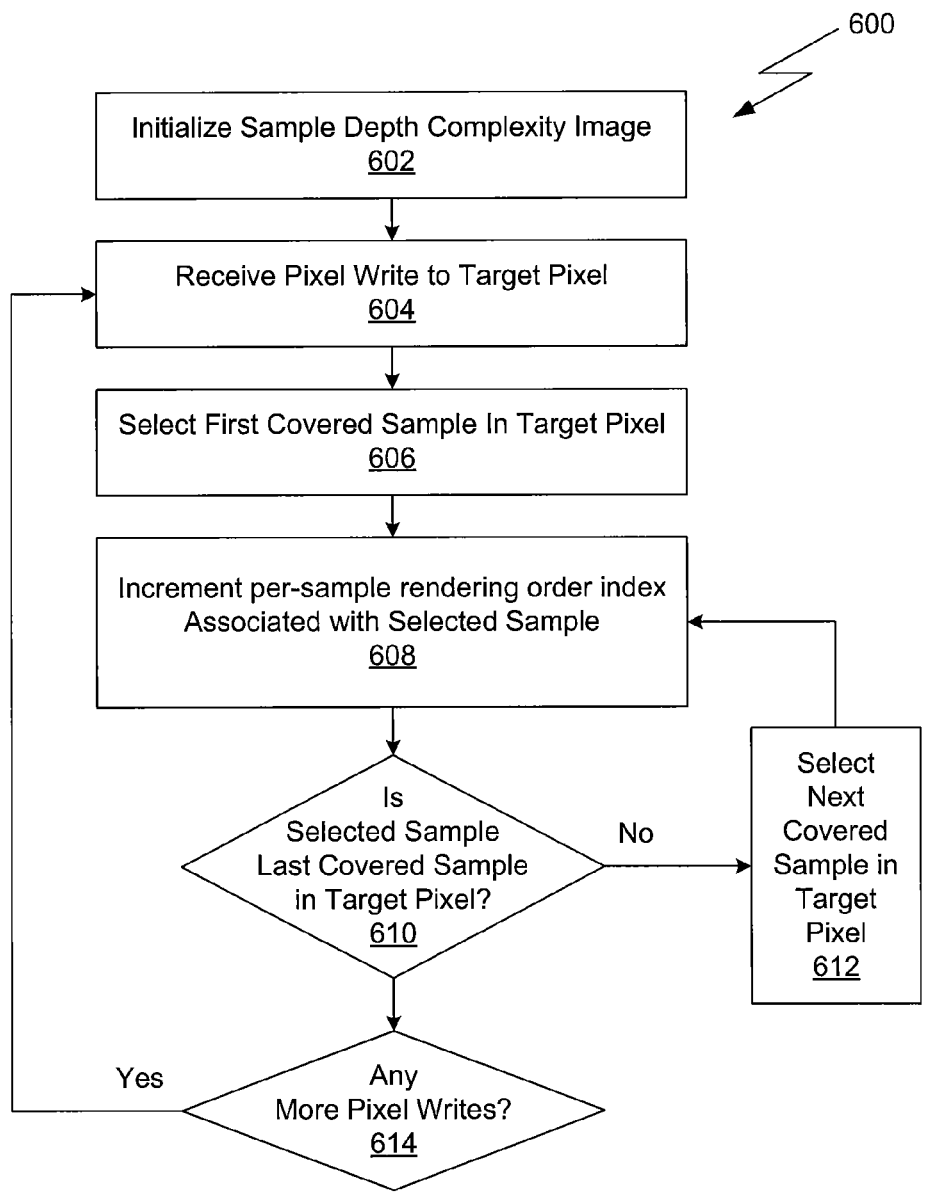
FIG. 6 is a flow diagram of method steps for creating the sample depth complexity image of FIG. 3C, according to one embodiment of the invention.

FIG. 6 is a flow diagram of method steps for creating the sample depth complexity image 360 of FIG. 3C, according to one embodiment of the invention. Although the method steps are described in conjunction with the systems for FIGS. 1-4, persons skilled in the art will understand that any system that performs the method steps, in any order, is within the scope of the invention. Further, although the method steps are described as being performed by the raster operations unit 214, the fragment shader 212 may perform one or more of the method steps instead of the raster operations unit 214 or in conjunction with the raster operations unit 214.

As shown, the method 600 begins at step 602, where the raster operations unit 214 initializes the sample depth complexity image 360 by setting all of the maximum PSROIs 370 included in the sample depth complexity image 360 to zero. At step 604, the raster operations unit 214 receives a write to a target pixel. At step 606, the raster operations unit 214 selects the first covered sample in the target pixel. The raster operations unit 214 may order the samples in any technically feasible fashion, such as primarily by X-coordinates and secondarily by Y-coordinates. At step 608, the raster operations unit 214 increments the maximum PSROI 370 associated with the selected sample. At step 610, if the raster operations unit 214 determines that the selected sample is not the last covered sample included in the target pixel, then the method 600 proceeds to step 612.

At step 612, the raster operations unit 214 selects the next covered sample in the target pixel, and the method 600 returns to step 608, where the raster operations unit 214 increments the maximum PSROI 370 associated with the selected sample. The method 600 continues in this fashion, looping through steps 608-612, until the raster operations unit 214 increments each of the sample depth complexities 370 that are associated with a covered sample in the target pixel.

If, at step 610, the raster operations unit 214 determines that the selected sample is the last covered sample in the target pixel, then the method 600 proceeds to step 614. At step 614, if the raster operation unit 214 determines that there are more pixel writes, then the method 600 returns to step 604, where the raster operations unit 214 receives a pixel write to a target pixel. The method 600 continues in this fashion, looping through steps 604-614, until the raster operations unit 214 receives all of the pixel writes and reflects the pixel writes in the sample depth complexity image 360.

Figure 7A:
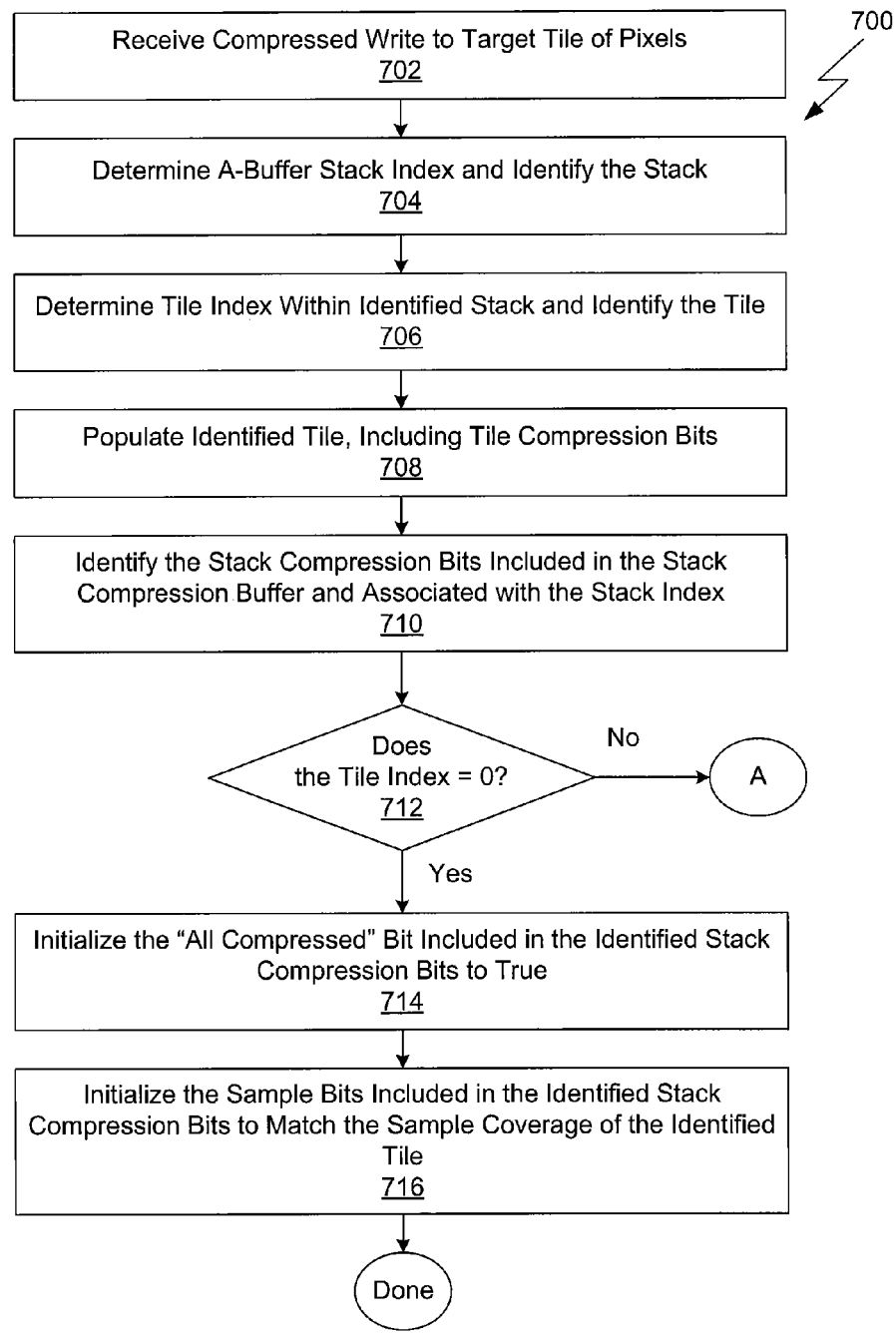
FIGS. 7A and 7B are a flow diagram of method steps for writing a compressed tile to the A-Buffer of FIG. 1, according to one embodiment of the invention.
Figure 7B:
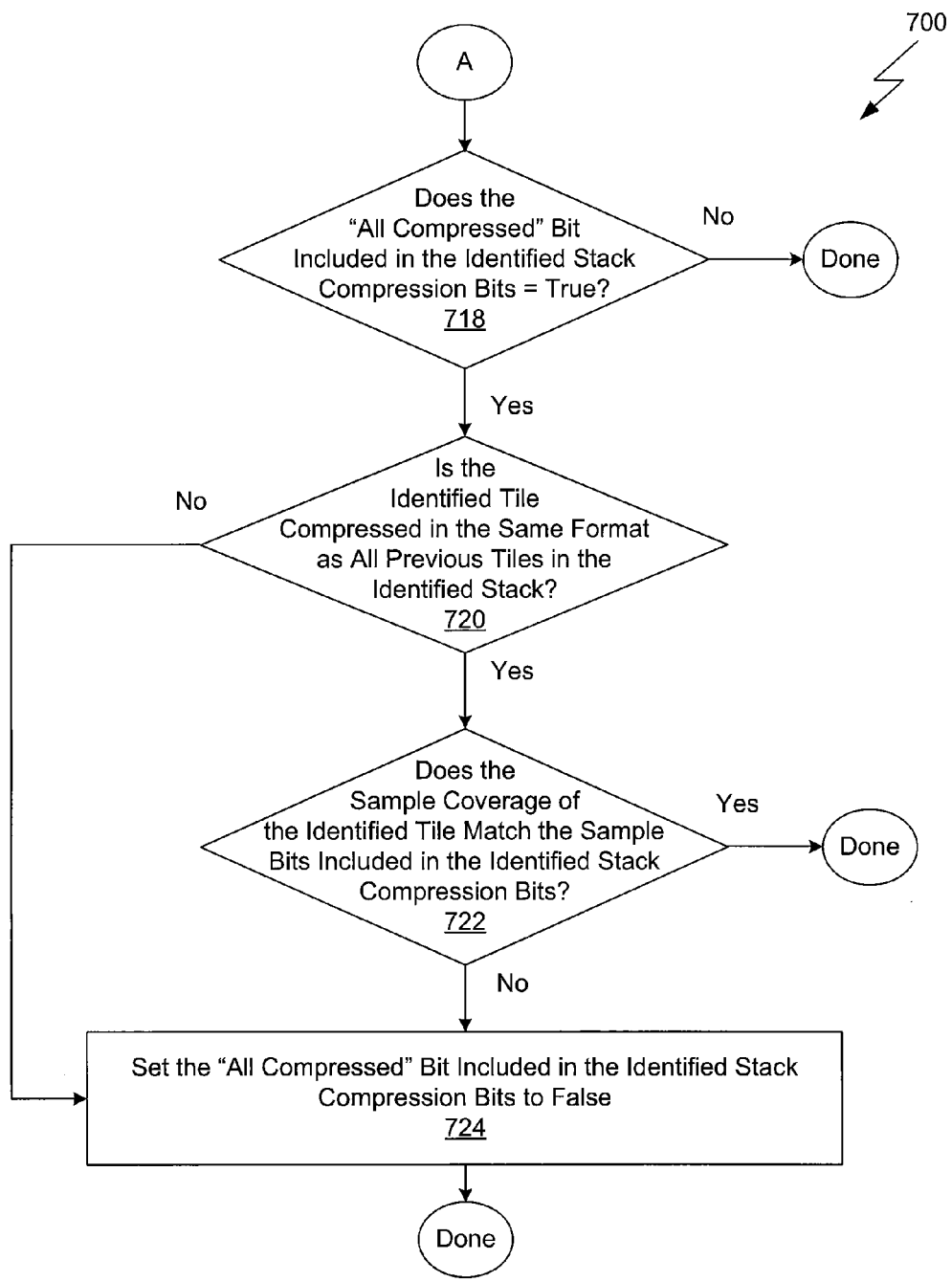

FIGS. 7A and 7B are a flow diagram of method steps for writing a compressed tile to the A-Buffer 144 of FIG. 1, according to one embodiment of the invention. Although the method steps are described in conjunction with the systems for FIGS. 1-4, persons skilled in the art will understand that any system that performs the method steps, in any order, is within the scope of the invention. Further, although the method steps are described as being performed by the raster operations unit 214, the fragment shader 212 may perform one or more of the method steps instead of the raster operations unit 214 or in conjunction with the raster operations unit 214.

As shown, the method 700 begins at step 702, where the raster operations unit 214 receives a compressed write to a target tile of pixels. At step 704, the raster operations unit 214 determines the A-Buffer stack index and identifies the stack 310 associated with the stack index and included in the A-Buffer 144. The raster operations unit 214 may determine the two-dimensional stack index in any technically feasible fashion. For example, the raster operations unit may use the tile size of the A-Buffer to calculate the stack index using integer division operations. At step 706, the raster operations unit 214 determines the tile index within the identified stack 310 and identifies the tile 320 associated with the tile index and included in the identified stack 310. The raster operations unit 214 may determine the one-dimensional tile index in any technically feasible fashion. For example, the raster operations unit may maintain an index for each stack that indicates the index of the next unpopulated tile, and the raster operations unit may set the tile index to match the index of the next unpopulated tile for the identified stack.

At step 708, the raster operations unit 214 populates the identified tile 320 using the data received during the compressed write. As part of step 708, the raster operations unit 214 updates the tile compression bits 350 included in the identified tile 320 to reflect the compression format for the identified tile 320. At step 710, the raster operations unit 214 identifies the stack compression bits 410 included in the stack compression buffer 146 and associated with the stack index. At step 712, if the raster operations unit 214 determines that the tile index equals zero (i.e., the identified tile 320 is the first tile 320 in the identified stack 310), then the method 700 proceeds to step 714. At step 714, the raster operations unit 214 initializes the "all compressed" bit 420 included in the identified stack compression bits 410 to true. In other words, the raster operations unit 214 sets the "all compressed" bit 420 included in the identified stack compression bits 410 to indicate that the single tile 320 in the identified stack 310 is compressed. At step 716, the raster operations unit 214 initializes the sample bits 440 included in the identified stack compression bits 410 to match the sample coverage of the identified tile 320, and the method 700 terminates.

If, at step 712, the raster operations unit 214 determines that the tile index does not equal zero (i.e., the identified tile 320 is not the first tile 320 in the identified stack 310), then the method 700 proceeds to step 718. At step 718, if the raster operations unit 214 determines that the value of the "all compressed" bit 420 included in the identified stack compression bits 410 is not equal to true, then the method 700 terminates. If, at step 718, the raster operations unit 214 determines that the value of the "all compressed" bit 420 included in the identified stack compression bits 410 is equal to true, then the method 700 proceeds to step 720.

At step 720, if the raster operations unit 214 determines that the identified tile 320 is not compressed in the same format as all of the previous tiles 320 included in the identified stack 310, then the method 700 proceeds to step 724. The raster operations unit 214 may determine whether the identified tile 320 is compressed in the same format as all of the previous tiles 320 included in the identified stack 310 in any technically feasible fashion. Since all of the previous tiles 320 in the identified stack 310 are compressed in the same format, the raster operations unit 214 only needs to determine whether the identified tile 320 is compressed in the same format as one of the previous tiles 320 included in the identified stack 310. Thus, the raster operations unit 214 may determine whether the identified tile 320 is compressed in the same format as the previous tiles 320 in the identified stack 310 by comparing the tile compression bits 350 included in the identified tile 320 to the tile compression bits 350 included in the first tile 320 in the identified stack 310. At step 724, the raster operations unit 214 sets the "all compressed" bit 420 included in the identified stack compression bits 410 to false, and the method 700 terminates.

If, at step 720, the raster operations unit 214 determines that the identified tile 320 is compressed in the same format as all of the previous tiles 320 included in the identified stack 310, then the method 700 proceeds to step 722. At step 722, if the raster operations unit 214 determines that the sample coverage of the identified tile 320 matches the sample bits 440 included in the identified stack compression bits 410, then the method 700 terminates. The raster operations unit 214 may determine whether the sample coverage of the identified tile 320 matches the sample bits 440 included in the identified stack compression bits 410 in any technically feasible fashion. For example, the raster operations unit 214 may examine the sample coverage represented by the data included in the identified tile 320 and compare this data to the sample bits 440 included in the identified stack compression bits 410. If, at step 722, the raster operations unit 214 determines that the sample coverage of the identified tile 320 does not match the sample bits 440 included in the identified stack compression bits 410, then the method 700 proceeds to step 724. At step 724, the raster operations unit 214 sets the "all compressed" bit 420 included in the identified stack compression bits 410 to false, and the method 700 terminates.

In sum, image rendering performance may be improved by using an A-Buffer structure that allows sample data to be stored in a way that increases the memory locality and supports existing compression techniques. In one embodiment, the A-Buffer is organized in three-dimensional stacks of uniformly-sized two-dimensional rectangular tiles, each stack representing a group of pixels and the samples included in the group of pixels. Each tile in a given stack includes the set of sample data at a specific PSROI that are associated with the group of pixels represented by the stack. Since each tile corresponds to a specific PSROI, the number of tiles in a given stack corresponds to the maximum maximum per-sample rendering order index associated with the samples in the group of pixels represented by the stack. To reduce memory usage, the GPU may assign a different number of tiles to each stack—calculating and using the maximum maximum PSROI of the samples included in the pixels represented by each stack to determine the appropriate number of tiles to allocate for the stack.

Each tile also includes tile compression bits. For a particular tile, the tile compression bits may specify a tile compression format that is supported by the GPU and that the tile uses to reduce the amount of data that the tile accesses to represent the set of sample data assigned to the tile. Further, during A-Buffer creation, a corresponding stack compression buffer is created. For each stack in the A-Buffer, the stack compression buffer includes an "all compressed" bit that indicates whether all of the tiles in the stack are similarly compressed. In one embodiment, a stack of tiles is determined to be similarly compressed only when all of the tiles in the stack are compressed and, for each pixel and each PSROI represented by the stack, the sample data for a particular pixel and a particular PSROI all have the same values. In other words, each pixel is fully covered by a single object at each level of PSROI used to represent the group of pixels included in the stack. The "all compressed" bit may be used by the GPU to determine whether to operate on the data included in a particular stack on a more efficient per pixel basis or a less efficient per sample basis.

Advantageously, organizing the A-Buffer by both pixel proximity and pixel PSROI improves the memory locality, thereby increasing the efficiency of memory accesses used when rendering image data. Moreover, selecting a tile size that facilitates compression, including tile compression bits in each tile, and creating the stack compression buffer enable the GPU to fully utilize existing compression techniques that reduce memory bandwidth and increase computational efficiency. Consequently, the overall performance of the graphics pipeline is improved.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for writing a tile to an A-Buffer, the method comprising:
   receiving a first compressed write associated with a first target tile;
   identifying a target stack within the A-buffer, wherein the A-buffer includes a plurality of stacks, each stack in the plurality of stacks includes one or more tiles where each tile has an associated index to identify the particular tile in the stack, and the target stack is included in the plurality of stacks;
   identifying the first target tile within the target stack;
   populating the first target tile with both:
      compressed pixel data including sample data associated with N-by-M pixels that are proximally located in an image frame and that have a same per-sample rendering order index (PSROI), wherein N and M are positive integers, and
      a set of tile compression bits that corresponds to the first compressed write;
   determining that the target stack does not include any previously-written tiles; and
   updating an all-compressed bit to true to indicate that all tiles included in the target stack include compressed pixel data, wherein the all-compressed bit corresponds to the target stack.

2. The method of claim 1, wherein the step of identifying the target stack comprises identifying a stack included in the A-Buffer that is associated with a group of pixels included in the first compressed write, each pixel in the group of pixels including a plurality of samples.

3. The method of claim 2, wherein the step of identifying the first target tile within the target stack comprises identifying an unwritten tile within the target stack via an index that is associated with the target tile.

4. The method of claim 1, further comprising the steps of:
   identifying a set of stack compression bits included in a stack compression buffer, wherein the set of stack compression bits corresponds to the target stack; and
   initializing sample bits included in the identified set of stack compression bits to match a sample coverage of the first target tile.

5. The method of claim 4, further comprising the steps of:
   receiving a second compressed write associated with a second target tile;
   identifying that the target stack includes the second target tile;
   identifying the second target tile within the target stack; and
   populating the second target tile with both:
      compressed pixel data, and
      a set of tile compression bits that corresponds to the second compressed write.

6. The method of claim 5, further comprising the steps of:
   determining whether the target stack includes any previously-written tiles;
   and, if so, determining whether the all-compressed bit included in the identified set of stack compression bits is set to true.

7. The method of claim 6, further comprising the step of determining whether the second target tile as well as the previously-written tiles are compressed in the same format.

8. The method of claim 7, further comprising the step of setting the all-compressed bit to false if the second target tile as well as the previously written tiles are not compressed in the same format.

9. The method of claim 7, further comprising the step of determining whether a sample coverage associated with the second target tile matches sample bits included in the identified set of stack compression bits.

10. The method of claim 9, further comprising the step of setting the all-compressed bit to false.

11. The method of claim 1, wherein each sample data for each pixel is associated with a polygon that intersects the pixel in an image frame that is being rendered for display.

12. The method of claim 1, wherein a particular pixel is associated with two or more sample data, and wherein two or more polygons intersect the particular pixel, and wherein each polygon covers a different one of the sample data associated with the particular pixel, and wherein each PSROI for each sample is equal to one.

13. A computer system, comprising:
a memory; and
a graphics processing unit coupled to the memory and configured to write a tile to an A-Buffer, by:
receiving a first compressed write associated with a first target tile;
identifying a target stack within the A-buffer, wherein the A-buffer includes a plurality of stacks, each stack in the plurality of stacks includes one or more tiles where each tile has an associated index to identify the particular tile in the stack, and the target stack is included in the plurality of stacks;
identifying the first target tile within the target stack;
populating the first target tile with both:
compressed pixel data including sample data associated with N-by-M pixels that are proximally located and that have a same per-sample rendering order index (PSROI), wherein N and M are positive integers, and
a set of tile compression bits that corresponds to the first compressed write;
determining that the target stack does not include any previously-written tiles; and
updating an all-compressed bit to true to indicate that all tiles included in the target stack include compressed pixel data, wherein the all-compressed bit corresponds to the target stack.

14. The computer system of claim 13, wherein the graphics processing unit is configured to identify the target stack by identifying a stack included in the A-Buffer that is associated with a group of pixels included in the first compressed write, each pixel in the group of pixels including a plurality of samples.

15. The computer system of claim 14, wherein the graphics processing unit is configured to identify the first target tile within the target stack by identifying an unwritten tile within the target stack via an index that is associated with the target tile.

16. The computer system of claim 13, wherein the graphics processing unit is further configured to:
identify a set of stack compression bits included in a stack compression buffer, wherein the set of stack compression bits corresponds to the target stack and the stack compression buffer is included in the graphics processing unit, and
initialize sample bits included in the identified set of stack compression bits to match a sample coverage of the first target tile.

17. The computer system of claim 16, wherein the graphics processing unit is further configured to:
receive a second compressed write associated with a second target tile,
identify that the target stack includes the second target tile,
identify the second target tile within the target stack, and
populate the second target tile with both:
compressed pixel data, and
a set of tile compression bits that corresponds to the second compressed write.

18. The computer system of claim 17, wherein the graphics processing unit is further configured to:
determine whether the target stack includes any previously-written tiles;
and, if so, determine whether the all-compressed bit included in the identified set of stack compression bits is set to true.

19. The computer system of claim 18, wherein the graphics processing unit is further configured to determine whether the second target tile as well as the previously-written tiles are compressed in the same format.

20. The computer system of claim 19, wherein the graphics processing unit is further configured to set the all-compressed bit to false if the second target tile as well as the previously written tiles are not compressed in the same format.

21. The computer system of claim 19, wherein the graphics processing unit is configured to determine whether a sample coverage associated with the second target tile matches sample bits included in the identified set of stack compression bits.

22. The computer system of claim 21, wherein the graphics processing unit is configured to set the all-compressed bit to false.

23. The computer system of claim 13, wherein the graphics processing unit comprises a raster operations unit and a fragment shader, and the steps of receiving the first and second compressed writes, identifying the target stack, identifying the first and second target tiles and populating the first and second target tiles are performed by either the raster operations unit, the fragment shader or by a combination of the raster operations unit and the fragment shader.

* * * * *